US009498877B1

(12) United States Patent
Henry

(10) Patent No.: US 9,498,877 B1
(45) Date of Patent: Nov. 22, 2016

(54) SHOVEL WITH TWO INTEGRAL HANDLES AND EXTERIOR HANDLE

(71) Applicant: Dell Henry, West Organge, NJ (US)

(72) Inventor: Dell Henry, West Organge, NJ (US)

(*) Notice: Subject to any disclaimer, the term of this patent is extended or adjusted under 35 U.S.C. 154(b) by 0 days.

(21) Appl. No.: 15/210,935

(22) Filed: Jul. 15, 2016

(51) Int. Cl.
*A01B 1/22* (2006.01)
*B25G 1/00* (2006.01)
*B25G 1/10* (2006.01)

(52) U.S. Cl.
CPC .......................... *B25G 1/10* (2013.01)

(58) Field of Classification Search
CPC .......................... E02F 3/02
USPC ........ 294/49, 51, 54.5, 57, 58, 60, 153, 178; 15/144.1; 16/430
See application file for complete search history.

(56) References Cited

U.S. PATENT DOCUMENTS 3,014,750 A * 12/1961 Briggs .................. A01B 1/026 294/58
D198,979 S * 8/1964 Petoe .................. 294/49
4,198,090 A * 4/1980 Gutman .................. A01B 1/22 16/429
5,133,101 A * 7/1992 Hauser .................. A47L 13/24 15/143.1
5,771,535 A * 6/1998 Blessing .................. B25G 1/06 15/144.1
5,799,996 A * 9/1998 Fredrickson .................. A01B 1/20 172/375
7,219,382 B2 * 5/2007 Johnson .................. A01B 1/022 7/116
D617,159 S * 6/2010 Blanchard .................. D8/10
8,740,272 B2 * 6/2014 Walden .................. A01B 1/026 294/58
8,939,484 B2 * 1/2015 Walden .................. A01B 1/026 294/58
D765,480 S * 9/2016 Walden .................. D8/10
2007/0187964 A1 * 8/2007 Marble .................. E01H 5/02 294/51

* cited by examiner

*Primary Examiner* — Paul T Chin
(74) *Attorney, Agent, or Firm* — Michael J. Feigin, Esq.; Feigin & Fridman

(57) ABSTRACT

A shovel with changeable ends and mirrored handle described herein has two circular handle regions. Each circular handle region has a lateral handle, and halfway between the distance from each circular handle region to the other is an exterior handle which rises from the plane of the circular handle regions and can be used to increase torque.

18 Claims, 3 Drawing Sheets

SHOVEL WITH TWO INTEGRAL HANDLES AND EXTERIOR HANDLE

FIELD OF THE DISCLOSED TECHNOLOGY

The disclosed technology relates generally to shovels, and, more specifically, to a shovel with a plurality of handles.

BACKGROUND OF THE DISCLOSED TECHNOLOGY

Shovels are needed to carry out a variety of functions, but they often are hard on the user's back. Further, sometimes one needs more torque/leverage. while at other times one needs greater extension. Shovels which allow greater flexibility in these areas, while being just as strong as prior art shovels, are needed in the art to improve functionality and ease of use.

SUMMARY OF THE DISCLOSED TECHNOLOGY

A shovel of embodiments of the disclosed technology has the following parts which are described generally from one side to the other. At a first extreme end of an elongated shovel (the "elongated" direction defined as that which is greatest from end to end) there is a shovel blade.

This blade is removably coupled (a non-permanent attachment, where "non-permanent" is defined as "able to be removed and re-attach without ordinarily causing structural damage") or fixedly coupled/attached (a permanent attachment, where "permanent" is defined as "unable to remove without ordinarily causing structural damage") to a first neck. This first neck is, in turn, fixedly coupled to a first circular region. This first circular region has, in embodiments, a handle which is normal to the elongated length of the shovel device as a whole. The first circular region is also fixedly coupled to an intermediate region.

The intermediate region is further fixedly coupled to a second circular region at an opposite side of the intermediate region from the first circular region. The second circular region further has a second lateral handle which is parallel to the first lateral handle. A third handle, an exterior handle, referred to as such because it rises exterior to the plane of the first and second handles as well as the intermediate region, is connected to the intermediate region at a mid-point of the intermediate region, which is half way between the first circular region and said second circular region.

A second neck is coupled to a scraper, the scraper being defined by a width narrower than the shovel with a generally trapezoidal shape. A tip thereof is pointed in a direction away from the shovel blade.

The circular regions can be identical (wherein "identical" is defined as "within a tolerance level acceptable in the industry and/or for the equipment used to manufacture the shovel and its parts"). So, too, the lateral regions of the handles can be identical. So, too, the necks can be identical. The circular regions can also be equidistant from the exterior handle. The exterior handle can be triangular.

A width of a tip of the scraper is equal to that of a tip of the shovel blade in embodiments. These tips point in opposite directions in embodiments. The shovel blade and scraper can be interchangeably positioned and attachable to either one of the necks. The first neck, the intermediate region, the first circular region, and the second circular region, excluding or including the first lateral handle and the second lateral handle, are of unitary construction formed from a single piece of metal, fiberglass, or the equivalent.

The shovel blade and scraper are replaceable and removable from the first neck and/or the second neck a plurality of times, without causing harm to said shovel blade, the scraper, and one or both of the first neck and the second neck, in embodiments. However, the first neck, the first circular region, the intermediate handle, the second circular region, and the second neck are, in embodiments of the disclosed technology, irreversibly integrated with each other, such that removal causes structural damage to same.

The lateral handles can be equally spaced from the exterior handle, the exterior handle being halfway between (at the midpoint between) each neck in embodiments of the disclosed technology. The first lateral handle and the second lateral handle are removably attached to respective circular regions, in embodiments of the disclosed technology.

The elongated length is the "length" for purposes of the claim language and is the direction which extends, for example, from neck to neck if one were to draw an imaginary line between them. The width and depth are perpendicular thereto and to each other. If the length is the X axis, then the width is the Y axis, and depth is the Z axis. The circular regions and the intermediate region can have an identical depth. However, the circular regions can have a width which is greater than a width of the intermediate region, "Substantially" and "substantially shown," for purposes of this specification, are defined as "at least 90%," or as otherwise indicated. "Identical" or "exactly," for purposes of this specification, is defined as "within an acceptable tolerance level known in the art." Any device may "comprise," or "consist of," the devices mentioned there-in, as limited by the claims. Any element described may be one of "exactly" or "substantially," as described.

It should be understood that the use of "and/or" is defined inclusively, such that the term "a and/or b" should be read to include the sets: "a and b," "a or b," "a," or "b."

DETAILED DESCRIPTION OF EMBODIMENTS OF THE DISCLOSED TECHNOLOGY

A shovel with changeable ends and mirrored handle described herein has two circular handle regions. Each circular handle region has a lateral handle, and halfway between two circular handle regions is an exterior handle which rises from the plane of the circular handle regions and can be used to increase torque.

Embodiments of the disclosed technology will become clearer in view of the forthcoming description of the figures.

Figure 1:
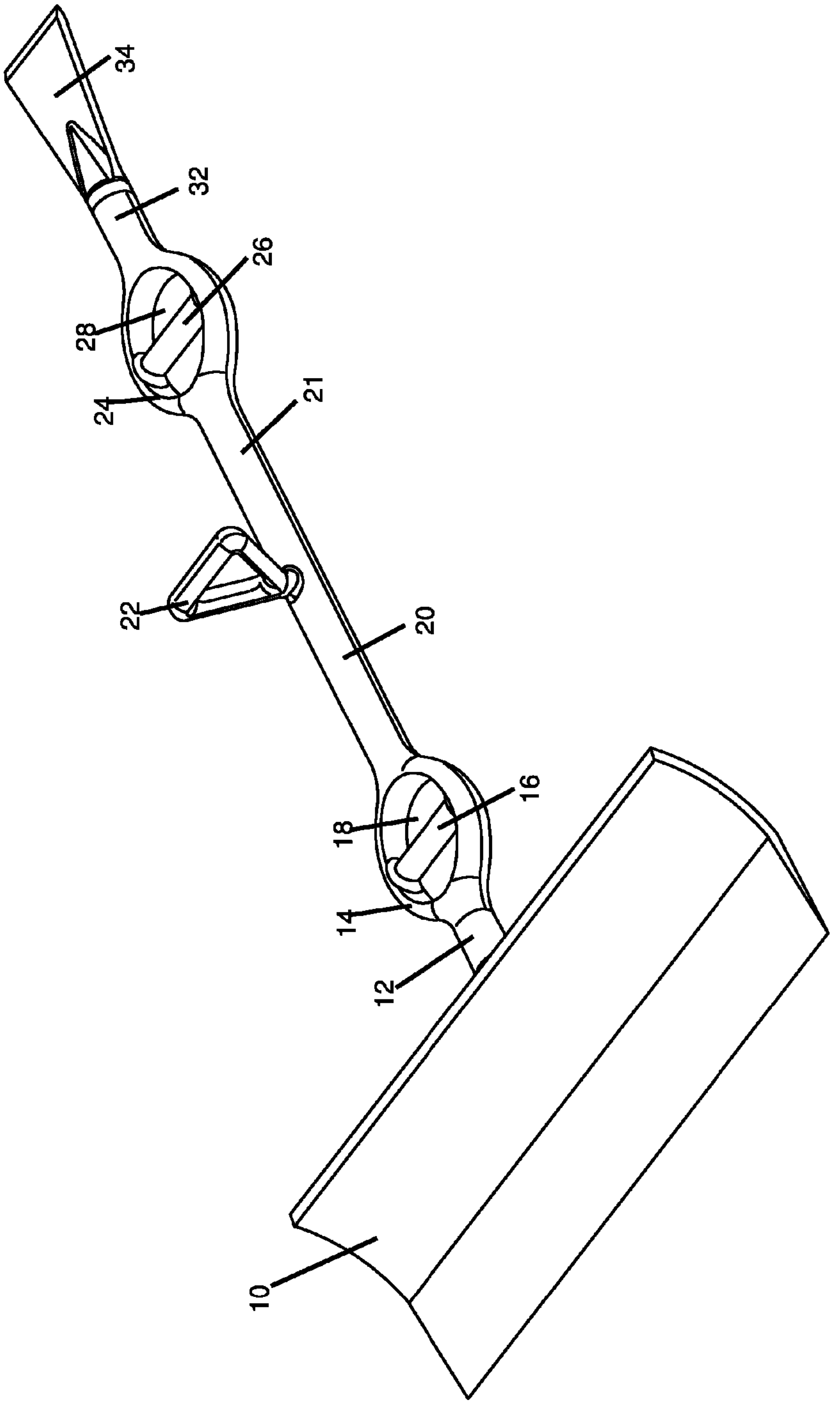
FIG. 1 shows a top perspective view of the shovel.
Figure 2:
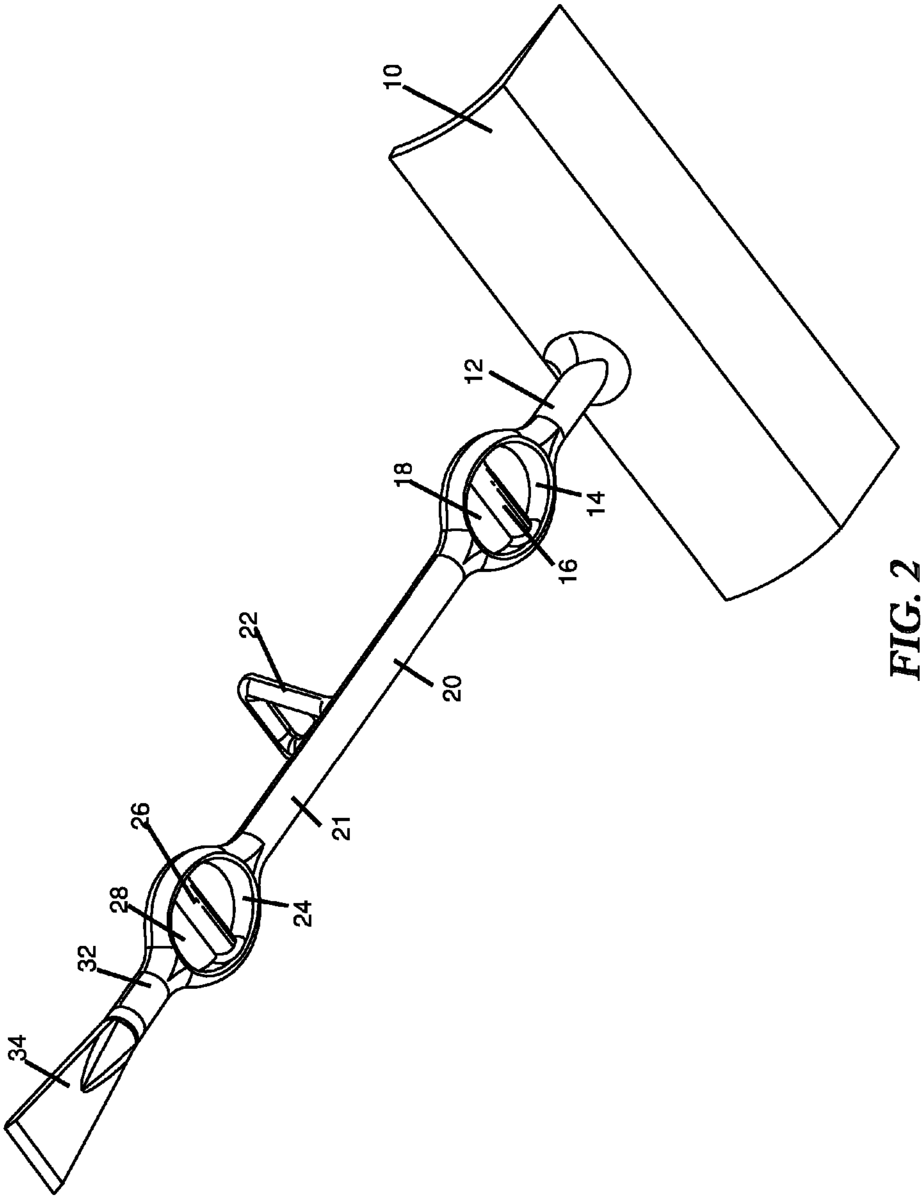
FIG. 2 shows a bottom perspective view thereof.
Figure 3:
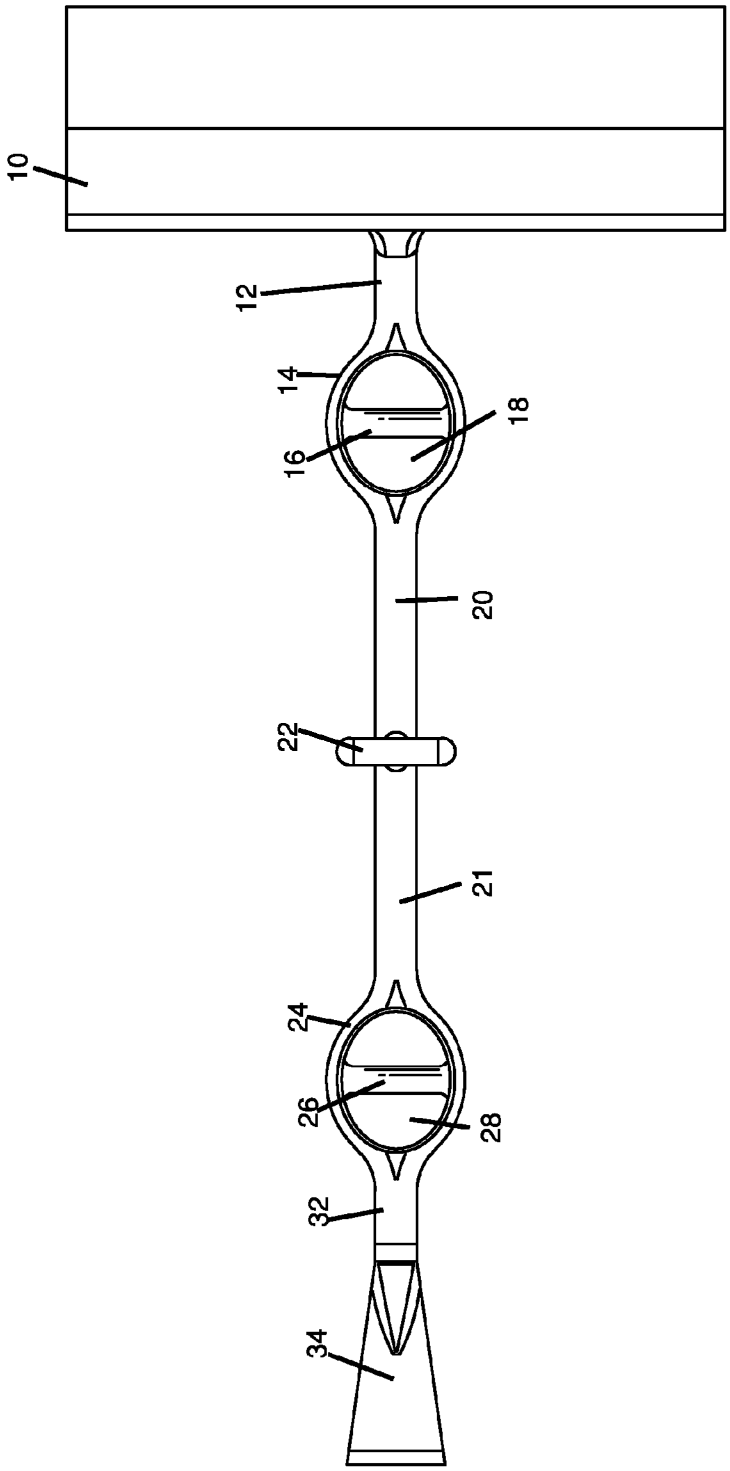
FIG. 3 shows a top plan view thereof.

FIG. 1 shows a top perspective view of the shovel. FIG. 2 shows a bottom perspective view thereof. FIG. 3 shows a top plan view thereof. A shovel blade 10 is on an extreme opposite side from a scraper 34. Each is attached removably to a respective first neck 12 and second neck 32. One can replace the shovel blade 10 and scraper 34 with one another, or use a different tool. A handle connects the tools at either longitudinal extreme end to each other. The handle, extending from the first neck 12 to the second neck 32, comprises parts which are fixedly attached to each other and cannot be removed without causing damage. Further, each of the parts is a unitary structure, except, in embodiments, for an external handle 22 and/or lateral handles 16 and 26.

In order, the handle has a first neck 12, a first circular region 14, an intermediate handle comprising, or consisting of, a proximate region 20 and distal region 21 which are bisected/defined by a break from each other at an external handle 22. Then, on the other side of the intermediate handle or intermediate region 20/21, is another circular region 24. On the other side of the circular region 24 is the second neck 32, which is connected to the scraper 34.

The circular regions 14 and 34 are identical, in embodiments of the disclosed technology. Each has a lateral handle 16 or 26 which extends (defined as "having a longest direction") perpendicular to the elongated length (again, the longest direction) of the shovel itself/an imaginary line drawn between a center of each neck 12 and 32. The exterior handle 22, shown here in a triangular shape, also extends perpendicular to the shovel, as well as to the lateral handles. That is, it generally extends "upward" from the intermediate region of the handle 20/21, and, more precisely, from the mid-point of the handle and mid-point of the intermediate handle. The handle region, which extends from neck 12 to neck 32 has a line of symmetry passing through the handle region and the exterior handle 22.

The circular regions 14 and 28, which are bisected by respective lateral handles 16 and 26, have hollow regions 18 and 28, in embodiments of the disclosed technology. These hollow regions allow one to place one's hands there-in while grasping a respective lateral handle. The hollow regions 18 and 28 can be circular, oval, or ovoid, with a lateral handle 16 or 26 bisecting the respective region into two parts or two equal-sized parts, such as of a semi-circular shape.

The extreme ends of the shovel blade 10 and scraper 32 (the ends farthest away from each other) can be of the same thickness. The scraper 32 can be trapezoidal or generally trapezoidal, and has at least two faces which are such. A wider end is farthest from the neck 32, and a narrow end is closest or adjacent to the neck 32.

In use, one can grasp any two of the three handles, using one hand on one handle and another hand on another handle. For example, when using the shovel blade 10, one might choose to grasp the exterior handle 22 and the lateral handle 26, in order to gain leverage and enough torque to rotate the shovel upwards. In another example, one might use the scraper 34 to chop at ice and want as much force normal to the tip of the scraper as possible. Therefore, the person might grasp lateral handle 16 and lateral handle 26 to do so.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods, systems, and devices described herein-above are also contemplated and within the scope of the disclosed technology.

I claim:

1. A shovel, comprising:

a shovel blade fixedly coupled to a first neck;

said first neck fixedly coupled to a first circular region;

said first circular region fixedly coupled to an intermediate region, and comprising a first lateral handle perpendicular to said first neck;

said intermediate region further fixedly coupled to a second circular region a side opposite side to said first circular region, said second circular region further comprising a second lateral handle parallel to said first lateral handle;

an exterior handle coupled to said intermediate region at a mid-point of said intermediate region between said first circular region and said second circular region;

a scraper having a tip pointed in a direction away from said shovel blade;

a second neck coupled to said scraper and said second circular region.

2. The shovel of claim 1, wherein said first circular region and said second circular region are identical, and said first lateral handle and said second lateral handle are identical.

3. The shovel of claim 2, wherein said first circular region and said second circular region are equidistant from said exterior handle.

4. The shovel of claim 3, wherein said first neck and said second neck are identical.

5. The shovel of claim 4, wherein said exterior handle is triangular.

6. The shovel of claim 5, wherein a width of said tip of said scraper is equal to that of a tip of said shovel blade, and said tip of said scraper and said tip of said shovel blade point in opposite directions.

7. The shovel of claim 6, wherein said first neck, said intermediate region, said first circular region, and said second circular region excluding said first lateral handle and said second lateral handle are of unitary construction formed from a single piece of metal or fiberglass.

8. The shovel of claim 7, wherein said first neck, said intermediate region, said first circular region, and said second circular region are of unitary construction formed from a single piece of metal or fiberglass.

9. The shovel of claim 6, wherein said shovel blade and said scraper are interchangeably positioned, and attachable to said first neck and said second neck.

10. The shovel of claim 9, wherein said shovel blade and said scraper are replaceable and removable from said first neck and/or said second neck a plurality of times, without causing harm to said shovel blade, said scraper, and one or both of said first and second necks.

11. The shovel of claim 9, wherein said first neck, said first circular region, said intermediate handle, said second circular region, and said second neck are irreversibly integrated with each other, such that removal causes structural damage to same.

12. The shovel of claim 11, wherein said first lateral handle and said second lateral handle are equally spaced from said exterior handle.

13. The shovel of claim 12, wherein said first lateral handle and said second lateral handle are removably attached to respective said first circular region and said second circular region.

14. The shovel of claim 13, wherein said scraper is generally trapezoidal in shape with a widest end furthest from said second neck and a narrowest end adjacent to said second neck.

15. The shovel of claim 14, wherein said first circular region, said second circular region, and said intermediate region have an identical depth, wherein depth is a direction perpendicular to a direction of an imaginary line extending between said first neck and said second neck.

16. The shovel of claim 15, wherein a width of said first circular region and said second circular region is greater than a width of said intermediate region, wherein said width is defined as a direction perpendicular to said depth and said direction of said imaginary line extending between said first neck and said second neck.

17. The shovel of claim 16, wherein said first circular region and said second circular region each have two semi-circular hollow regions.

18. A method of using the shovel of claim 17, comprising steps of grasping at least two of said first lateral handle, said second lateral handle, and said external handle.

* * * * *